(12) United States Patent
Wiehe et al.

(10) Patent No.: US 11,337,055 B2
(45) Date of Patent: May 17, 2022

(54) STATELESS NETWORK ARCHITECTURE

(71) Applicant: Nokia Solutions and Networks Oy, Espoo (FI)

(72) Inventors: Ulrich Wiehe, Bad Hersfeld (DE); Bruno Landais, Pleumeur-Bodou (FR); Erwan Duval, Ploubezre (FR); Philippe Bellec, Perros-Guirec (FR)

(73) Assignee: Nokia Solutions and Networks Oy, Espoo (FI)

( * ) Notice: Subject to any disclaimer, the term of this patent is extended or adjusted under 35 U.S.C. 154(b) by 382 days.

(21) Appl. No.: 16/339,486

(22) PCT Filed: Oct. 7, 2016

(86) PCT No.: PCT/EP2016/073972
§ 371 (c)(1),
(2) Date: Apr. 4, 2019

(87) PCT Pub. No.: WO2018/065063
PCT Pub. Date: Apr. 12, 2018

(65) Prior Publication Data
US 2021/0281996 A1    Sep. 9, 2021

(51) Int. Cl.
*H04W 8/18*    (2009.01)
*H04W 84/04*    (2009.01)

(52) U.S. Cl.
CPC ........... *H04W 8/18* (2013.01); *H04W 84/042* (2013.01)

(58) Field of Classification Search
CPC ...... H04W 8/18; H04W 84/042; H04W 84/00
See application file for complete search history.

(56) References Cited

U.S. PATENT DOCUMENTS

| | | | | |
|---|---|---|---|---|
| 2004/0193677 A1* | 9/2004 | Dar | ................... | H04L 29/12433 709/203 |
| 2012/0124156 A1* | 5/2012 | Esteban Vares | ........ | H04L 67/24 709/206 |
| 2014/0317261 A1 | 10/2014 | Shatzkamer et al. | .......... | 709/223 |
| 2015/0189460 A1 | 7/2015 | Zhang et al. | ......................... | 4/5 |

FOREIGN PATENT DOCUMENTS

EP    2 993 866 A1    3/2016

OTHER PUBLICATIONS

3GPP TR 23.799 V1.0.2 (Sep. 2016), "3rd Generation Partnership Project; Technical specification Group Services and System Aspects; Study on architecture for Next Generation System (Release 14)", pp. 177 and 305.

(Continued)

*Primary Examiner* — Brandon J Miller
(74) *Attorney, Agent, or Firm* — Harrington & Smith

(57) ABSTRACT

It is provided a method, including monitoring if a trigger to start a transaction for a user equipment or for a user is received; requesting, from a data layer and based on an identification of the user equipment or the user, respectively, an identifier of a set of one or more nodes when the trigger is received; forwarding the trigger to at least one node among the one or more nodes of the set.

6 Claims, 10 Drawing Sheets

(56) References Cited

OTHER PUBLICATIONS

3GPP TS 28.525 V1.0.0 (Sep. 2016), "3$^{rd}$ Generation Partnership Project; Technical specification Group Services and System Aspects; Telecommunication management; Life Cycle Management (LCM) for mobile networks that include virtualized network functions; Requirements (Release 14)", 41 pgs.
ETSI GS NFV-SWA 001 V1.1.1 (Dec. 2014), "Network Functions Virtualisation (NFV); Virtual Network Functions Architecture", 93 pgs.
3 GPP SA WG2 Meeting #117, Oct. 17-21 Kaohsiung, Taiwan, S2-166284, "Updates on Control plane interconnection model with a data layer", Nokia et al., 16 pgs.

* cited by examiner

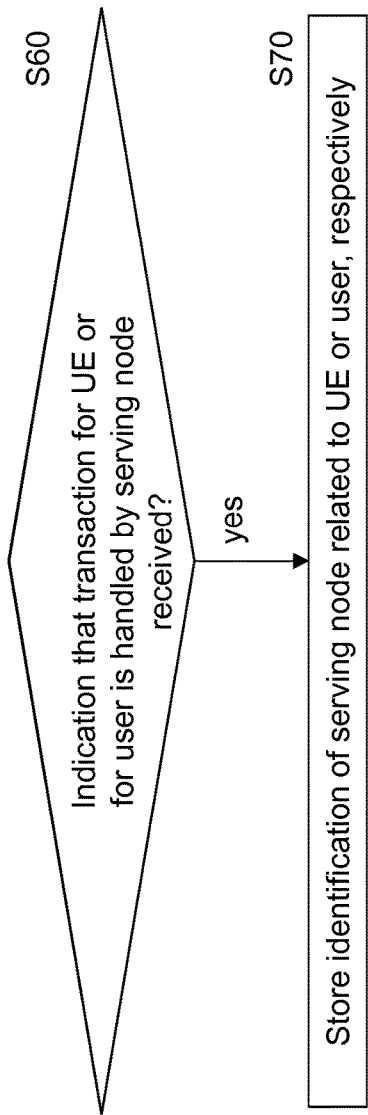
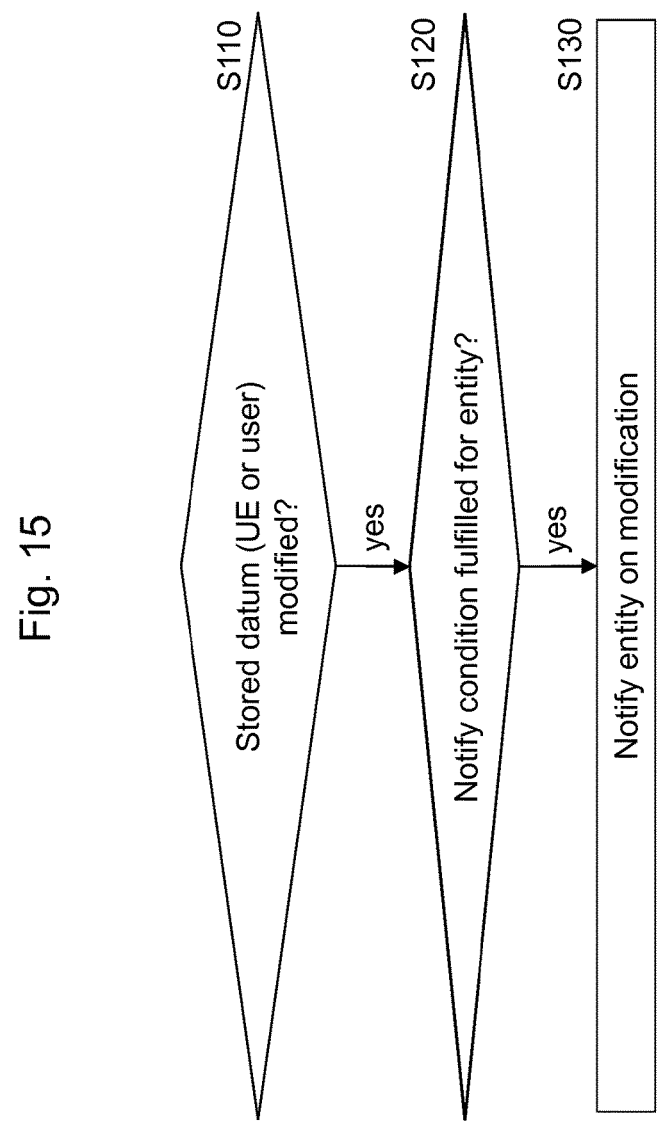
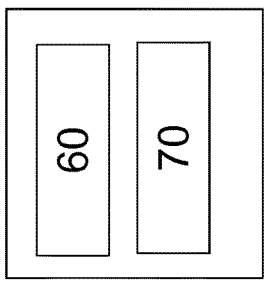
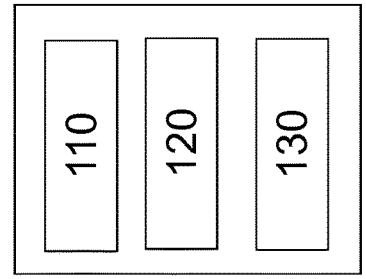
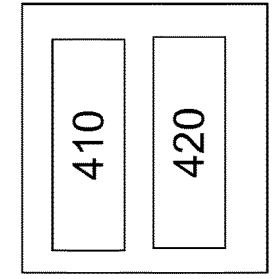

STATELESS NETWORK ARCHITECTURE

CROSS REFERENCE TO RELATED APPLICATION

This patent application is a U.S. National Stage application of International Patent Application Number PCT/EP2016/073972 filed Oct. 7, 2016, which is hereby incorporated by reference in its entirety.

FIELD OF THE INVENTION

The present invention relates to an apparatus, a method, and a computer program product related to a stateless network architecture. More particularly, the present invention relates to an apparatus, a method, and a computer program product of a mobile network employing stateless serving nodes.

Abbreviations
3GPP Third Generation Partnership Project
5G $5^{th}$ Generation
AS Application Server
DRA Diameter Routing Agent
DSR Delete Subscriber data Request
EPC Evolved Packet Core
FE Front End
GMSC Gateway Mobile Service Center
GW Gateway
HLR Home Location Register
HPLMN Home PLMN
HSS Home Subscriber Server
IDA Insert subscription Data Answer
IDR Insert subscription Data Request
IMEI International Mobile Equipment Identity
IMSI International Mobile Subscriber Identity
ISD Insert Subscriber Data
MME Mobility Management Entity
MSISDN Mobile Station International Subscriber Directory Number
MSM Mobility and Session Management entity
MT Mobile Terminating
NOR Notification Request
ODB Operator Determined Barring
PLMN Public Land Mobile Network
RA Routing Agent
SCS/AS Services Capability Server/Application Server
SCEF Service Capability Exposure Function
SDL Shared Data Layer
SMS Short Message Service
UE User Equipment
VNF Virtual Network Function
VPLMN Visited PLMN

BACKGROUND OF THE INVENTION

This application relates to a data centric architecture for 3GPP based mobile core networks where entities like HSS and MME store data externally in a centralized database (Shared Data Layer) and thus become stateless and dataless.

In legacy network deployments with stateful EPC entities, the mobility management entity (MME) serving a registered UE is well known (by its identity and/or address) to other entities such as the HSS, i.e. the HSS stores in its database the identity/address of the MME that is currently serving the UE. This allows network initiated signalling (e.g. from HSS) to be sent towards the serving node (MME) that currently serves (or can serve) the UE.

The Shared Data Layer concept enables a flexible cloud-optimized network design with simplified stateless VNFs. A virtual, stateless and dataless serving node (MSM—Mobility and Session Manager), when triggered to start a transaction for a UE, accesses the data needed to serve the UE from the SDL, performs any needed action as long as needed to serve the UE, and when detecting that the UE no longer needs to be served (until the next trigger), updates the data for the UE in the SDL and deletes all locally stored data for the UE.

While there is no ongoing transaction for a given UE, a trigger to start a transaction can be handled by any MSM that has access to the SDL. However, as long as there is an ongoing transaction for the UE at a specific MSM instance, any trigger must be handled by that MSM instance and hence must be routed to that MSM instance.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least monitoring if a trigger to start a transaction for a user equipment or for a user is received; requesting, from a data layer and based on an identification of the user equipment or the user, respectively, an identifier of a set of one or more nodes when the trigger is received; forwarding the trigger to at least one node among the one or more nodes of the set.

The at least one memory and the computer program code may be arranged to cause the apparatus to further perform checking if the user equipment or the user, respectively, is served by a predefined serving entity if the trigger is received; inhibiting the requesting of the identifier if the user equipment or the user, respectively, is served by the serving entity; forwarding the trigger to the serving entity if the user equipment or the user, respectively, is served by the serving entity.

The at least one memory and the computer program code may be arranged to cause the apparatus to further perform handling the trigger by the serving entity if the user equipment or the user, respectively, is served by the serving entity.

The at least one memory and the computer program code may be arranged to cause the apparatus to further perform checking if the set comprises plural nodes; selecting at least one of the plural nodes based on a predefined criterion if the set comprises plural nodes; forwarding the trigger to the selected at least one of the plural nodes.

The requesting may not comprise an indication of a kind of the trigger.

According to a second aspect of the invention, there is provided an apparatus, comprising at least one processor, at least one memory including computer program code, and the at least one processor, with the at least one memory and the computer program code, being arranged to cause the apparatus to at least perform at least monitoring if an indication is received that a first serving node handles a first transaction for a user equipment or for a user; storing an identification of the first serving node as being related to the user equipment or to the user, respectively, when the indication is received.

The indication may be received from one of the first serving note and a routing agent.

The at least one memory and the computer program code may be arranged to cause the apparatus to further perform checking if the identification of the first serving node is stored as being related to the user equipment or to the user, respectively; supervising if the user equipment or the user, respectively, is reachable; storing an identification of one or more second serving nodes as being related to the user equipment or the user, respectively, if the identification of the first serving node is not stored as being related to the user equipment or to the user, respectively, and the user equipment or the user, respectively, is reachable.

The at least one memory and the computer program code may be arranged to cause the apparatus to further perform inhibiting the storing of any identification of a serving node if the user equipment or the user, respectively, is not reachable.

The at least one memory and the computer program code may be arranged to cause the apparatus to further perform checking if a first message is received according to which a second transaction is to be performed for the user equipment or the user, respectively; providing the identification of the first serving node when the message is received.

The at least one memory and the computer program code may be arranged to cause the apparatus to further perform checking if a second message is received according to which a third transaction is to be performed for the user equipment or the user, respectively; providing the identification of the one or more second serving nodes when the message is received, the identification of the first serving node is not stored as being related to the user equipment or to the user, respectively, and the user equipment or the user, respectively, is reachable.

According to a third aspect of the invention, there is provided an apparatus, comprising at least one processor, at least one memory including computer program code, and the at least one processor, with the at least one memory and the computer program code, being arranged to cause the apparatus to at least perform at least monitoring if a value of a stored datum is modified, wherein the datum is related to a user equipment or a user; checking if a notify condition is fulfilled, wherein respective identifiers of one or more sets are stored as being related to the notify condition, each of the sets comprises respective one or more entities, and the notify condition is stored as being related to the datum; notifying at least one respective device of each of the sets that the value of the datum is modified if the value is modified and the notify condition is fulfilled.

The at least one memory and the computer program code may be arranged to cause the apparatus to further perform determining if a first number of the entities of a first set of the sets is smaller than a total number of the entities of the first set, wherein the first number of the entities is to be notified; selecting the first number of the nodes among the entities of the first set according to a predefined criterion if the first number is smaller than the total number; wherein notifying may comprise notifying the selected entities that the value of the datum is modified.

The at least one memory and the computer program code may be arranged to cause the apparatus to further perform receiving the notify condition from at least one entity of a second set of one or more entities; storing the identifier of the second set as being related to the notify condition.

The at least one memory and the computer program code may be arranged to cause the apparatus to further perform supervising if a one time flag is set, wherein the one time flag is related to the notify condition and a third set of the sets; supervising if at least one of the entities of the third set is notified that the value of the datum is modified; removing the identifier of the third set from the one or more identifiers stored as being related to the notify condition if the one time flag is set and the at least one entitiy of the third set is notified.

According to a fourth aspect of the invention, there is provided a method, comprising monitoring if a trigger to start a transaction for a user equipment or for a user is received; requesting, from a data layer and based on an identification of the user equipment or the user, respectively, an identifier of a set of one or more nodes when the trigger is received; forwarding the trigger to at least one node among the one or more nodes of the set.

The method may further comprise checking if the user equipment or the user, respectively, is served by a predefined serving entity if the trigger is received; inhibiting the requesting of the identifier if the user equipment or the user, respectively, is served by the serving entity; forwarding the trigger to the serving entity if the user equipment or the user, respectively, is served by the serving entity.

The method may further comprise handling the trigger by the serving entity if the user equipment or the user, respectively, is served by the serving entity.

The method may further comprise checking if the set comprises plural nodes; selecting at least one of the plural nodes based on a predefined criterion if the set comprises plural nodes; forwarding the trigger to the selected at least one of the plural nodes.

The requesting may not comprise an indication of a kind of the trigger.

According to a fifth aspect of the invention, there is provided a method, comprising monitoring if an indication is received that a first serving node handles a first transaction for a user equipment or for a user; storing an identification of the first serving node as being related to the user equipment or to the user, respectively, when the indication is received.

The indication may be received from one of the first serving note and a routing agent.

The method may further comprise checking if the identification of the first serving node is stored as being related to the user equipment or to the user, respectively; supervising if the user equipment or the user, respectively, is reachable; storing an identification of one or more second serving nodes as being related to the user equipment or the user, respectively, if the identification of the first serving node is not stored as being related to the user equipment or to the user, respectively, and the user equipment or the user, respectively, is reachable.

The method may further comprise inhibiting the storing of any identification of a serving node if the user equipment or the user, respectively, is not reachable.

The method may further comprise checking if a first message is received according to which a second transaction is to be performed for the user equipment or the user, respectively; providing the identification of the first serving node when the message is received.

The method may further comprise checking if a second message is received according to which a third transaction is to be performed for the user equipment or the user, respectively; providing the identification of the one or more second serving nodes when the message is received, the identification of the first serving node is not stored as being related to the user equipment or to the user, respectively, and the user equipment or the user, respectively, is reachable.

According to a sixth aspect of the invention, there is provided a method, comprising monitoring if a value of a stored datum is modified, wherein the datum is related to a user equipment or a user; checking if a notify condition is fulfilled, wherein respective identifiers of one or more sets are stored as being related to the notify condition, each of the sets comprises respective one or more entities, and the notify condition is stored as being related to the datum; notifying at least one respective device of each of the sets that the value of the datum is modified if the value is modified and the notify condition is fulfilled.

The method may further comprise determining if a first number of the entities of a first set of the sets is smaller than a total number of the entities of the first set, wherein the first number of the entities is to be notified; selecting the first number of the nodes among the entities of the first set according to a predefined criterion if the first number is smaller than the total number; wherein the notifying may comprise notifying the selected entities that the value of the datum is modified.

The method may further comprise receiving the notify condition from at least one entity of a second set of one or more entities; storing the identifier of the second set as being related to the notify condition.

The method may further comprise supervising if a one time flag is set, wherein the one time flag is related to the notify condition and a third set of the sets; supervising if at least one of the entities of the third set is notified that the value of the datum is modified; removing the identifier of the third set from the one or more identifiers stored as being related to the notify condition if the one time flag is set and the at least one entity of the third set is notified.

In the second, third, fifth, and sixth aspects, each of the entities may be one of a serving node, a front end of a subscriber register, and an application server.

In the second, third, fifth, and sixth aspects, the notify condition may be statically configured, or wherein the notify condition is dynamically configurable.

Each of the methods of the fourth to sixth aspects may be a method of a stateless network architecture.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
triggers are routed to the "suitable" MSM instance;
it is avoided that two MSM instances operate simultaneously on the same UE;
the architecture is flexible and optimized for cloud-based deployment; and
signaling may be reduced if the node identifier points to a set of MSMs (nodes).

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 14 shows an apparatus according to an embodiment of the invention;

FIG. 15 shows a method according to an embodiment of the invention;

FIG. 16 shows an apparatus according to an embodiment of the invention;

FIG. 17 shows a method according to an embodiment of the invention; and

FIG. 18 shows an apparatus according to an embodiment of the invention.

DETAILED DESCRIPTION OF CERTAIN EMBODIMENTS

Figure 1:
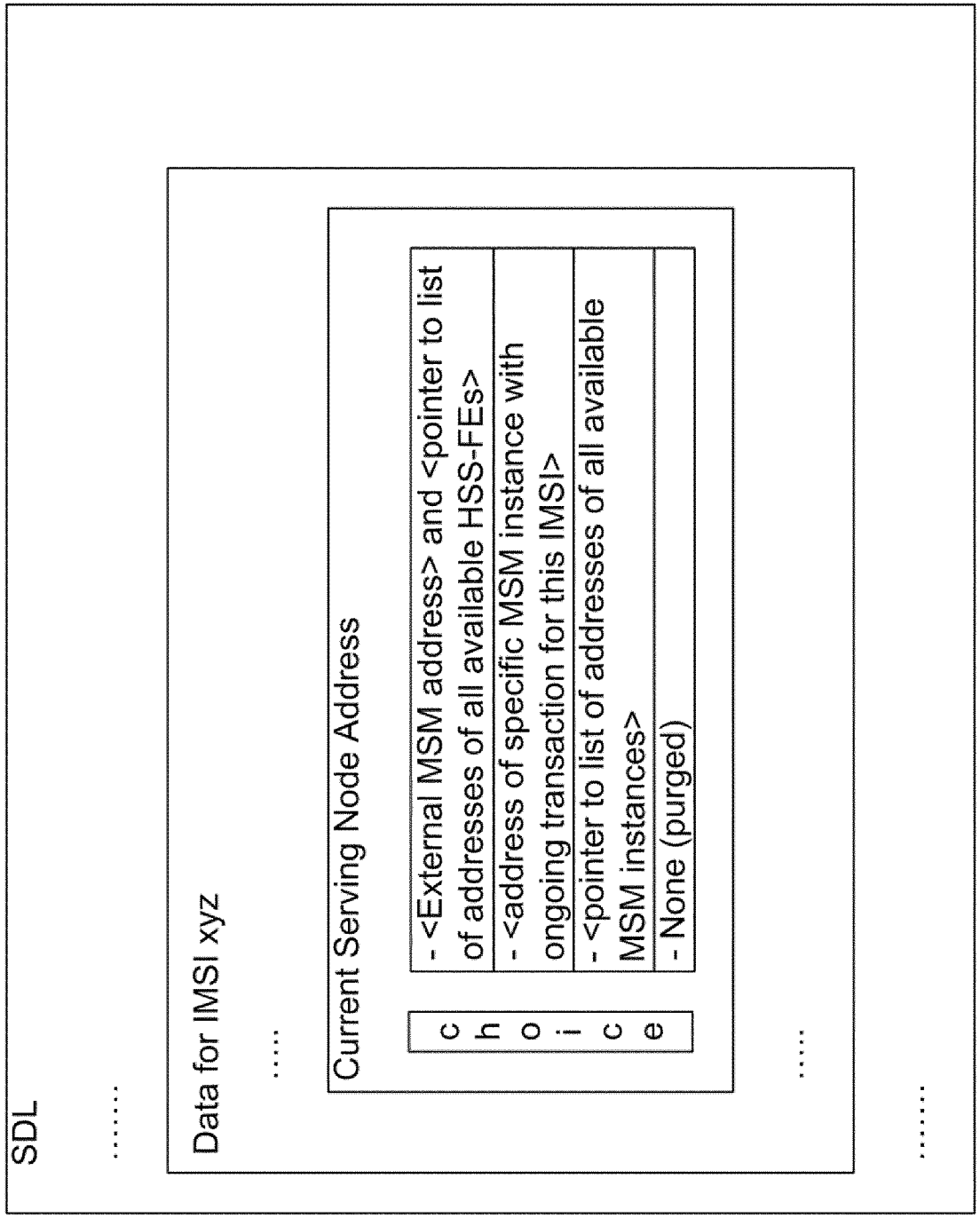
FIG. 1 depicts the structure of the Current Serving Node Address according to some embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

A trigger to start a transaction for a UE may either be originated by an external entity (i.e. a node that has no access to the SDL) on a standardized interface, or by the SDL (i.e. a notification of data change). For both cases it must be ensured that the trigger is routed to the "suitable" MSM instance: If there is no ongoing transaction for the UE, the trigger shall be routed to any of the available MSM instances taking into account e.g. load. If there is an ongoing transaction for the UE at a specific MSM instance, the trigger shall be routed to exactly that MSM instance.

Some embodiments of the invention ensure that triggers are routed to the "suitable" MSM instance, in particular in a cloud-based/stateless network architecture.

External Trigger

According to some embodiments of the invention, at least one routing agent (RA) that has access to the SDL is deployed so that the external trigger is received by the RA. The RA reads the SDL to see whether there is an ongoing transaction for the UE at one of the MSM instances. If so, the trigger is forwarded to that MSM instance. Otherwise any MSM instance can be selected (e.g. based on load information or some other predefined criterion such as latency, geographical location, etc.).

In these embodiments, the SDL may hold information (identity/address) about:
  a) the MSM instance that currently serves the UE. This information may be written to the
  SDL e.g. by the selected MSM instance at transaction start (or by the RA at MSM instance selection or by the SDL at notify sending) and may be deleted by the MSM instance at transaction end; or
  b) the set of MSM instances which may be used to serve the UE (when no specific MSM instance is currently serving the UE). This set may correspond to the MSM pool to which the UE is registered (i.e. the MSMs pertaining to a specific network slice or Dedicated Core Network), or to all the MSM instances (possibly pertaining to different MSM pools) having access to the SDL. The identity of the MSM pool to which the UE is registered may be written to the SDL e.g. by the selected MSM instance when the UE registers to the MSM pool.

The RA functionality may alternatively be supported within core network entities having access to the SDL, e.g. in an Application Front End, such as an HSS-FE in non-roaming scenarios, or e.g. in the User Plane GW.

In roaming scenarios, the RA according to some embodiments of the invention may be located in the visited PLMN, i.e. in the PLMN owning the SDL keeping track of the MSM instance serving the UE. Network entities from other PLMNs, e.g. the HSS, SCEF or SMS-GMSC in the HPLMN, should initiate signalling towards one RA of the VPLMN. Instead of storing the address of the particular mobility management entity serving the UE (as in legacy 3GPP networks), the HSS (as an example of the other network entities) stores an identifier or address of the pool of mobility management entities the UE is registered to, or alternatively, an identifier or address of the RA(s) in the VPLMN. HPLMN-initiated signalling is then routed to an RA of the VPLMN based on the stored identifier or address.

For Diameter based interfaces, the RA may be supported by a Diameter Routing Agent (DRA) as an example.

In some embodiments of the invention, a separate RA is not deployed. E.g., the RA functionality may be integrated in some or all MSMs. An external trigger may be routed to any of these MSMs. In these MSMs, the RA functionality may read the SDL in order request the identity of the appropriate MSM, as discussed for the RA.

In some embodiments of the invention, the RA functionality receiving the trigger may first check if one of one or more predefined MSMs has an ongoing transaction for the UE. If this is the case, there is no need to read the SDL and the trigger is handled by the respective one of the predefined MSMs.

For example, if the RA functionality is implemented in an MSM, the MSM may consider first if it currently has an ongoing transaction for the UE itself. That is, the MSM (RA functionality in the MSM) may either
  1) detect that it currently has an ongoing transaction for the UE; in this case the MSM handles the trigger as part of the ongoing transaction; or
  2) read the SDL and detects that another MSM instance currently has an ongoing transaction for the UE. If so, the trigger is forwarded to that specific MSM instance; or
  3) read the SDL and detects that there is no ongoing transaction for the UE at any MSM instance. The MSM then handles the trigger, i.e. starts an ongoing transaction, or forwards the trigger to another MSM instance, e.g. as a function of the load of the MSM(s) or another predefined criterion or some other predefined criterion such as latency, geographical location, etc.

When the RA reads the SDL in order to request an identification of one or more MSMs, the RA may not inform SDL on the kind of trigger received by the RA. It may inform SDL only on the identification of the UE.

In summary, in some embodiments of the invention, the SDL may store the identity of the MSM instance that has an ongoing transaction for the UE (if any), or an identifier of the set of MSM instances (e.g. MSM pool) which may be used to serve the UE (when no specific MSM instance is currently serving the UE). RAs or other network entities may read this from the SDL and forward any received trigger to the specific MSM that handles the ongoing transaction.

Notification

FIG. 1 depicts the structure of the Current Serving Node Address according to some embodiments of the invention. That is, in the SDL, data for a particular UE (identified by its IMSI with value xyz) are stored. One of these data is the address of the currently serving node ("Current serving Node Address").

As may be seen in FIG. 1, the SDL may store the identity/address of the serving node that currently serves the UE. This is one of:
  a1) Address of an external MSM (i.e. external to the network to which SDL belongs) together with a pointer to a list of addresses of suitable HSS-FEs that can contact the external MSM. This alternative is applicable for outbound roaming own UEs.
  a2) Address of a specific MSM instance. This alternative is applicable for non-roaming own UEs and for inbound roaming foreign UEs that are currently bound to the specific MSM instance because of an ongoing transaction for the UE at that MSM instance.
  a3) Pointer to a set of addresses of available MSM instances that can serve the UE. This alternative is applicable for non-roaming own UEs and for inbound roaming foreign UEs that are currently not bound to a specific MSM instance.

a4) None. This alternative is applicable for purged UEs and (new) UEs that have never been registered to a serving node.

A node can "subscribe to" any data stored in the SDL. If so, the SDL should notify the subscribing node as soon as the subscribed data is modified while a notification condition associated with the node's subscription is met.

For stored data X there may be associated "metadata" stored that may comprise at least one of:
- a) allowed values for X (updating with not allowed value is rejected),
- b) list of nodes that are allowed to read/write X (read/write access from non authorized nodes is rejected); and
- c) list of node identifiers (each node identifier either identifies a single node or a set of one or more nodes, e.g. as a pointer to a set of node addresses).

The list of node identifiers identifies a node (or set of nodes) that must be notified (or out of which one, some, or all nodes must be notified—considering the stored selection mechanism) when the data X is modified and an associated stored notify condition is met, and for each entry in the list of node identifiers, one or more of the following metadata may be stored:
- c1) notify condition (e.g. modifying node=XYZ, new value=a, . . . ),
- c2) selection mechanism for cases where a set of nodes is identified by the node identifier (e.g. a pointer to a set of node addresses). Selection mechanism may be e.g. none, round robin, random, multicast, . . . , or may be based on some predefined criterion such as least loaded, small latency, geographical location, . . . .
- c3) one time notification (yes/no); if this flag is set to "yes", the respective node identifier is removed from the list of node identifiers for the stored data X after a notification that the value of X was changed had been sent. Otherwise, the node identifier is maintained in the list even after a notification was sent.
- c4) data reference (referring to data who's actual values need to be added to the notification message (when sent)).

Figure 2:
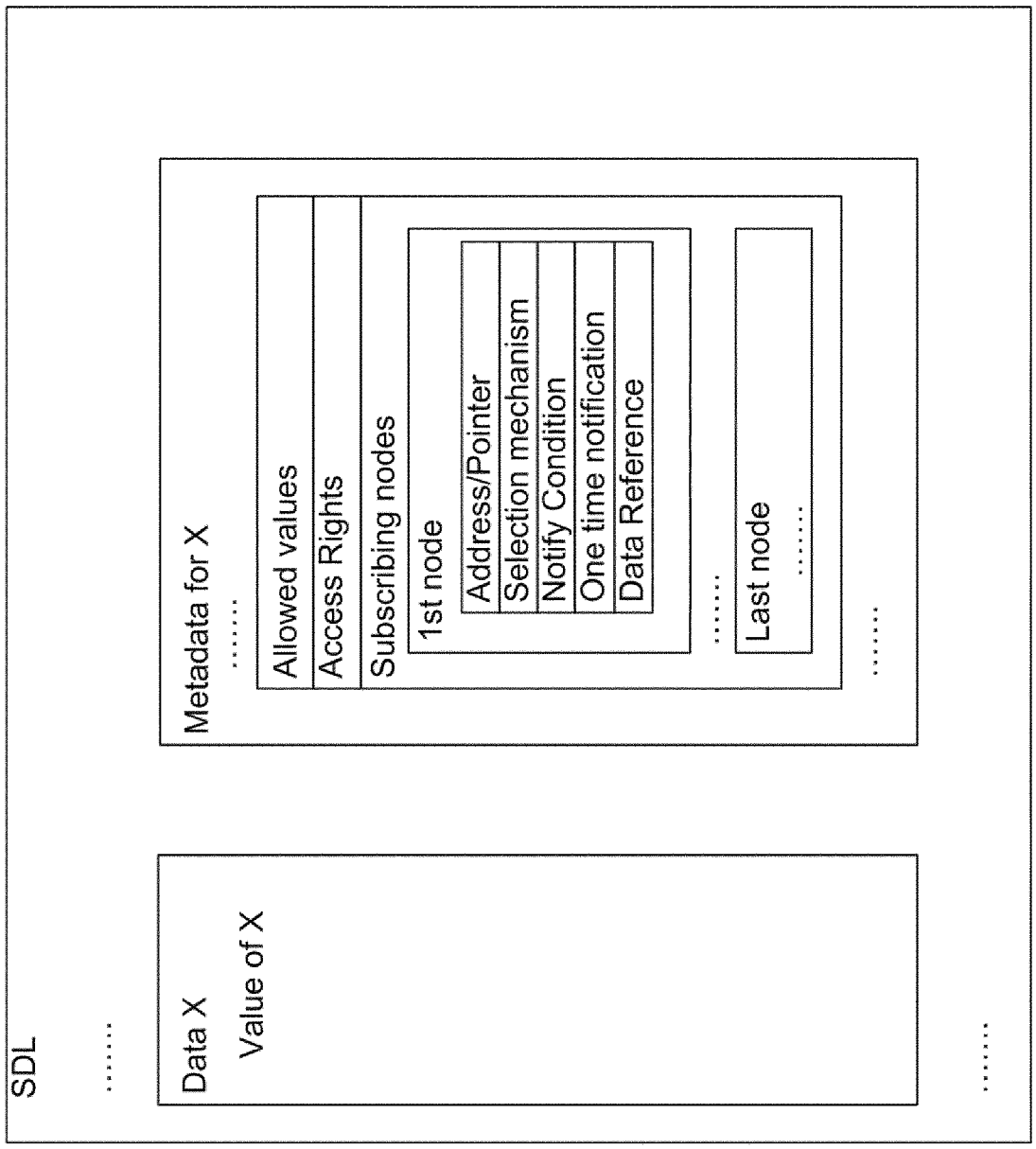
FIG. 2 depicts the structure of metadata according to some embodiments of the invention.

FIG. 2 depicts the structure of metadata according to some embodiments of the invention. As may be seen in FIG. 2, in the SDL, data (e.g. datum X) with a corresponding value of X is stored. Metadata for X are associated to X. The metadata may comprise at least one of Allowed values for X, Access Rights for X and Subscribing nodes, which is a list of nodes and/or sets of nodes, as described under a) to c). For each of the subscribing nodes (i.e. for each node or each set of nodes), one or more further metadata as described under c1) to c4) may be stored. "Address/Pointer" denotes the identifier of the respective node or set of nodes (e.g. of the 1$^{st}$ node in FIG. 2).

The following examples present use cases according to some embodiments of the invention:

Example 1

Figure 3:
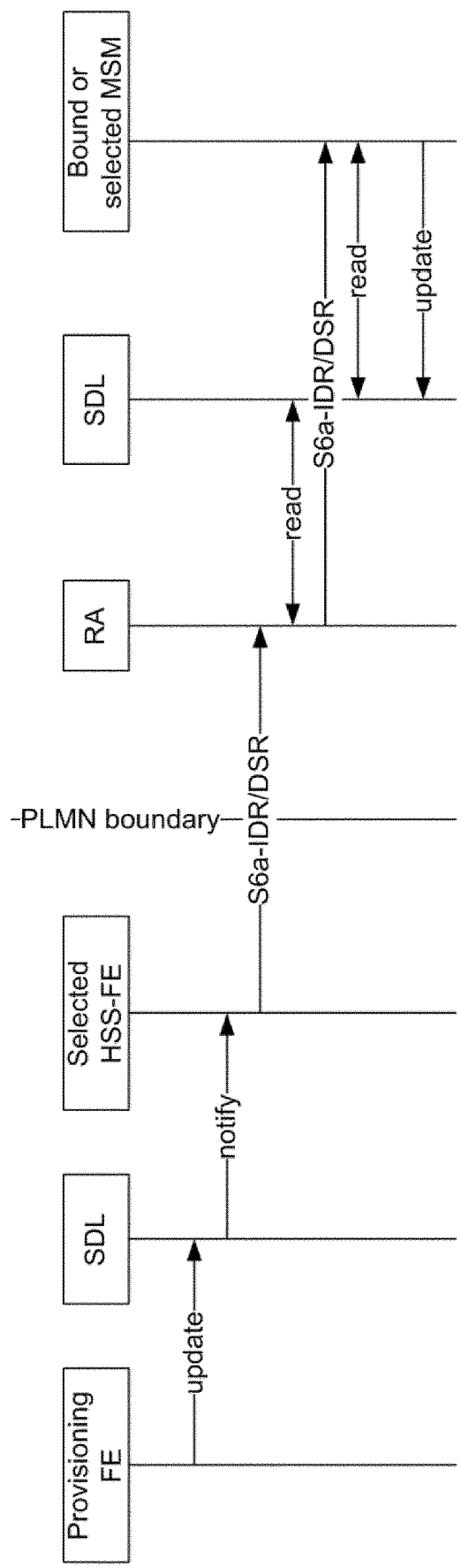
FIG. 3 shows that Provisioning FE updates subscription data while UE is outbound roaming according to some embodiments of the invention (S6a-IDA/DSA messages are not shown for convenience; they are used for acknowledgement)
Figure 5:
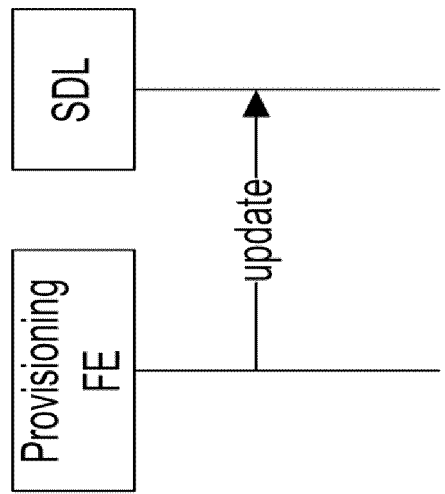
FIG. 5 shows that Provisioning FE updates subscription data while UE is purged according to some embodiments of the invention.
Figure 4:
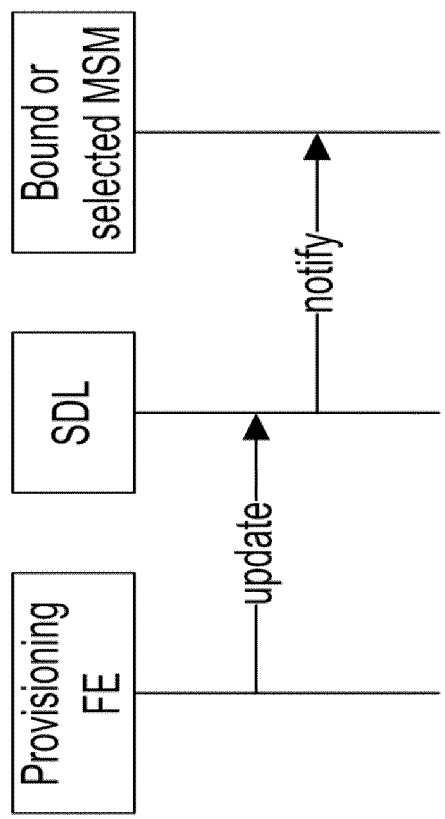
FIG. 4 shows that Provisioning FE updates subscription data while UE is not roaming and not purged according to some embodiments of the invention.

FIGS. 3 to 5

In this Example the piece of data X is the permanent subscription data Operator-Determined-Barring category 3 "Barring of all outgoing calls" which can take one of the values "barred" or "not-barred". For own UEs only Provisioning FEs have write access to X. For inbound roamers only MSMs have write access to X.

A pointer to the Current Serving Node Address (which effectively points to either
- the list of addresses of available HSS-FEs that can contact the external MSM, or
- the address of the specific MSM that has an ongoing transaction for the UE, or
- the list of addresses of MSMs that can serve the UE, or nothing depending on the current alternative type of the Current Serving Node Address) is configured to be in the list of nodes that must be notified when X is modified, along with a notify condition of "modifying node=Provisioning FE", a selection mechanism of e.g. "round robin", and the one time notification set to "no".

As a consequence (for an own UE), modification of the ODB category 3 from "not barred" to "barred" by a Provisioning FE results in
- a notification being sent from the SDL to the next in round HSS-FE (if the UE is outbound roaming, see FIG. 3); or
- a notification being sent from the SDL to the specific MSM instance that currently has an ongoing transaction for the UE ("Bound MSM"; if the UE is not roaming and a specific MSM instance currently has an ongoing transaction for the UE), see FIG. 4; or
- a notification being sent from the SDL to the next in round MSM instance ("Selected MSM"; if the UE is not roaming and no MSM instance currently has an ongoing transaction for the UE), see FIG. 4; or
- no notification being sent (if the UE is purged) see FIG. 5.

n detail, for the roaming case of FIG. 3, if the Provisioning FE updates SDL, SDL (since current Serving Node Address=External MSM address) selects and notifies the selected HSS-FE in the own network (HPLMN of the roaming UE). By IDR/DSR of the 3GPP S6a interface, the HSS-FE of the own network informs the RA in the visited PLMN. That is, the HSS-FE in HPLMN considers the RA in VPLMN as an MME serving the UE. The RA in VPLMN reads SDL in VPLMN in order to identify the MSM in the VPLMN currently having an ongoing transaction for the UE ("Bound MSM") or to identify the need to select a next MSM instance ("Selected MSM") if the UE does not have a currently ongoing transaction.

When RA in the VPLMN is informed on the Bound MSM or has selected the Selected MSM, it informs the Bound or Selected MSM on the update using IDR/DSR of 3GPP S6a interface. The next read step is relevant only for a case that the MSM is a selected MSM which currently does not have an ongoing transaction with the UE. In this case, the Selected MSM reads the data stored for the UE in the SDL of VPLMN such that it becomes a "Bound MSM". If the MSM anyway has a transaction with the UE (i.e., the MSM is a "Bound MSM"), the data of the UE are anyway known to the MSM such that the read step is not required. If the ongoing transaction(s) including the update of the ODB data are finished, the Bound MSM updates the data in the SDL of VPLMN and acknowledges the S6a-IDR/DSR message by sending S6a-IDA/DSA via RA to the HSS-FE.

In all cases, in the SDL of HPLMN, the pointer to the Current Serving Node Address is not removed from list of nodes to be notified as the "one time notification" has value "no".

As a consequence (for an inbound roaming UE), modification of the ODB category 3 from "not barred" to "barred" by an MSM (resulting from an S6a-IDR message received from the HSS) does not result in a notification since the notify condition (modifying node=Provisioning FE) is not met. The notify condition for any subscription data (data that can be modified only by provisioning) may be pre-configured in the SDL not only in the VPLMN but also in the HPLMN. For example, a common notify condition may be used for all subscription data.

In detail, for the non-roaming cases of FIGS. 4 and 5, if the Provisioning FE updates the SDL, the SDL (if current Serving Node Address=address of bound MSM) notifies the bound MSM; or (if current Serving Node=pointer to a list of available MSM instances) selects and notifies the selected MSM; or (if there is no current serving node) does not send any notify.

Example 2

Figure 6:
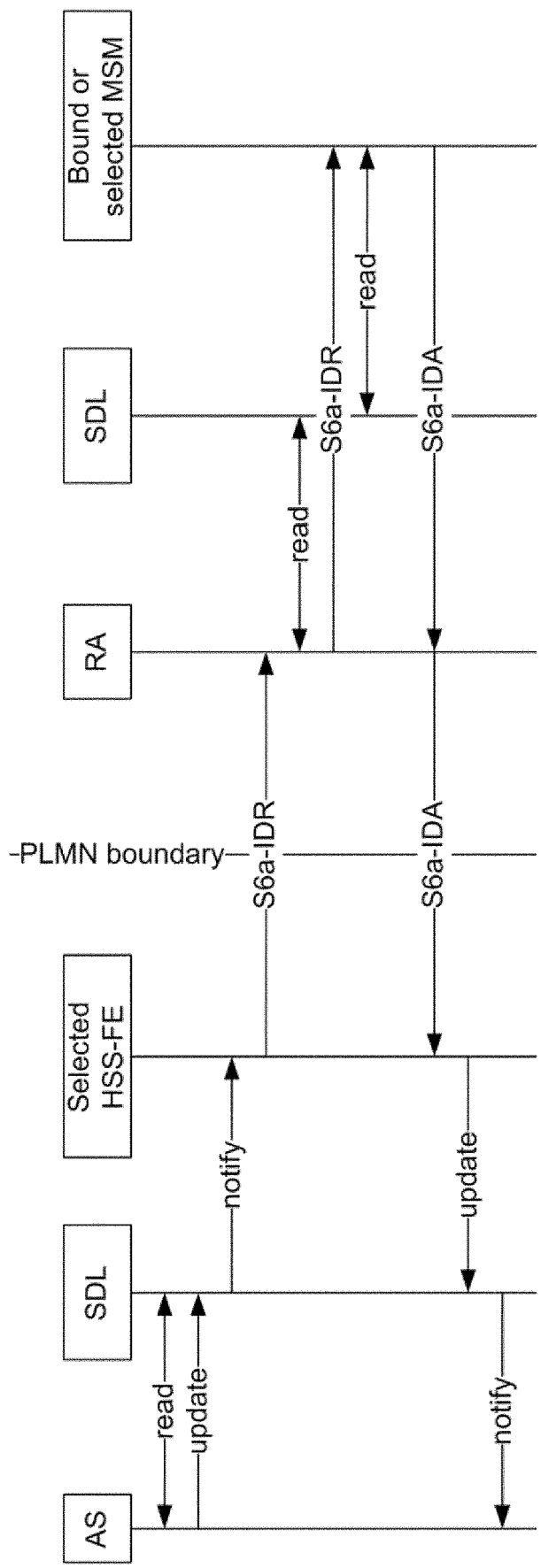
FIG. 6 shows that AS retrieves current location while UE is outbound roaming according to some embodiments of the invention.
Figure 8:
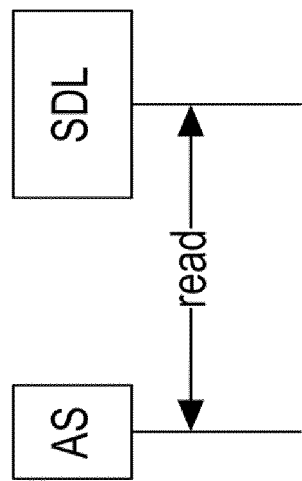
FIG. 8 shows that AS does not try to retrieve current location as it detects that the UE is not reachable according to some embodiments of the invention.
Figure 7:
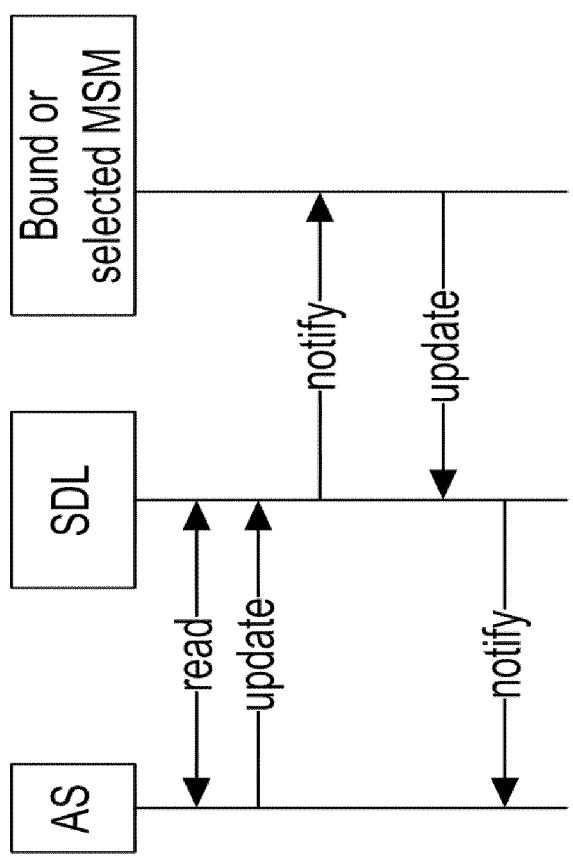
FIG. 7 shows that AS retrieves current location while UE is not roaming and known not to be reachable according to some embodiments of the invention.

FIGS. 6 to 8

In this Example, the piece of data X is the temporary Indicator "active location retrieval" which can take one of the values "requested" or "completed". Write access (with value "requested") is granted to one or more Application Servers (ASs) that have access to the SDL and are allowed to retrieve an own UE's current location. Write access (with value "completed") is granted to MSMs, and to HSS-FEs for outbound roaming UEs.

Nodes (ASs) that have write access with value "requested" are also allowed to add their own address to the list of nodes to be notified in X's metadata along with a notify condition of "old value="requested" AND new value "completed"", a selection mechanism of "not applicable", and the one time notification set to "yes".

In addition—similar as in example 1—a pointer to the Current Serving Node Address (which effectively points to either the list of addresses of available HSS-FEs that can contact the external MSM, or the address of the specific MSM that has an ongoing transaction for the UE, or the list of addresses of MSMs that can serve the UE, or nothing depending on the current alternative type of the Current Serving Node Address) is configured to be in the list of nodes that must be notified when X is modified, along with a notify condition of "old value="completed" AND new value="requested"", a selection mechanism of e.g. "round robin", and the one time notification set to "no".

As a consequence, when an AS (for an own UE)—after reading the SDL and detecting that the UE is outbound roaming or not roaming but reachable (e.g. not purged, not detached, . . . )

updates X to become "requested" this results in a notification being sent from the SDL to the e.g. next in round HSS-FE (if the own UE is outbound roaming, FIG. 6); or a notification being sent from the SDL to the specific MSM instance that currently has an ongoing transaction for the UE (if the UE is not roaming and a specific MSM instance currently has an ongoing transaction for the UE, FIG. 7 ("Bound MSM")); or a notification being sent from the SDL to the next in round MSM instance (if the UE is not roaming and no MSM instance currently has an ongoing transaction for the UE, FIG. 7 ("Selected MSM"));

In all these cases the node identifier (e.g. pointer) of the Current Serving Node Address is not removed from list of nodes to be notified as the "one time notification" has value "no".

And, when an MSM (for UEs they serve, FIG. 7) or an HSS-FE (for outbound roaming UEs, FIG. 6) updates X to become "completed" this results in a notification being sent to all ASs that have added their own address to the list of to be notified nodes in X's metadata. After sending the notifications, the addresses (together with the associated selection mechanism, one time notification and notify condition) are removed from the list of nodes to be notified in X's metadata as the one time notification has value "yes".

The outbound roaming case of FIG. 6 corresponds largely to that of FIG. 3 except for the following: The acknowledgement S6a-IDA in FIG. 6 contains information (UE's current location) that is updated to the SDL and then notified to the AS, while the acknowledgement S6a-IDA/DSA in FIG. 3 does not.

If the AS detects that the UE is not reachable it does not try to retrieve its current location (FIG. 8). In this case, the process finishes after AS had read the UE data from SDL.

Example 3

Figure 9:
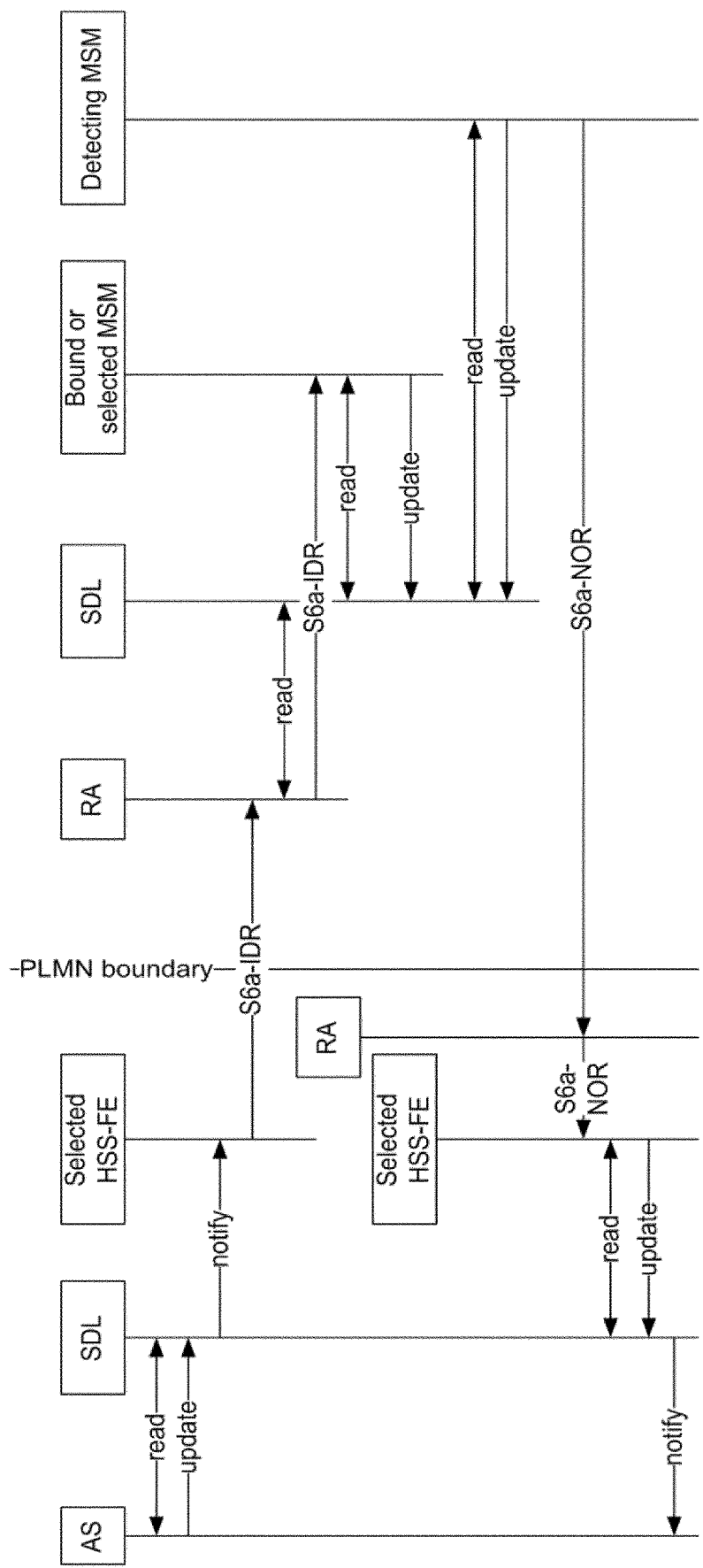
FIG. 9 shows that AS requests to be notified as soon as (and gets notification when) outbound roaming UE becomes reachable according to some embodiments of the invention (S6a-IDA/NOA messages are not shown for convenience; they are used for acknowledgement)
Figure 11:
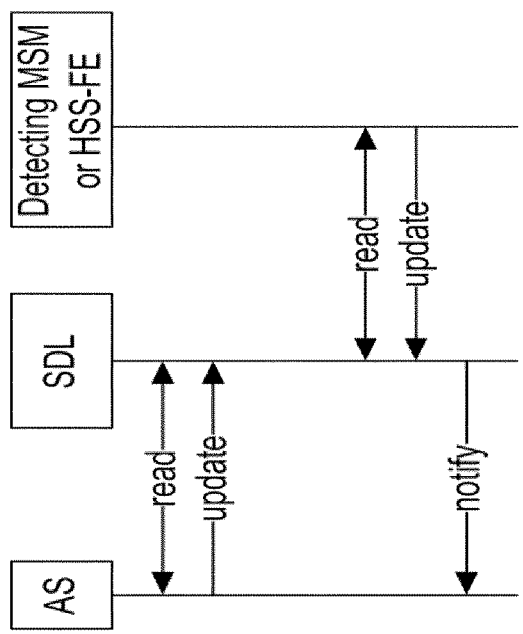
FIG. 11 shows that AS requests to be notified as soon as (and gets notification when) non-roaming UE which is currently not bound to a specific MSM instance or a purged UE becomes reachable (within HPLMN or in a VPLMN) according to some embodiments of the invention.
Figure 10:
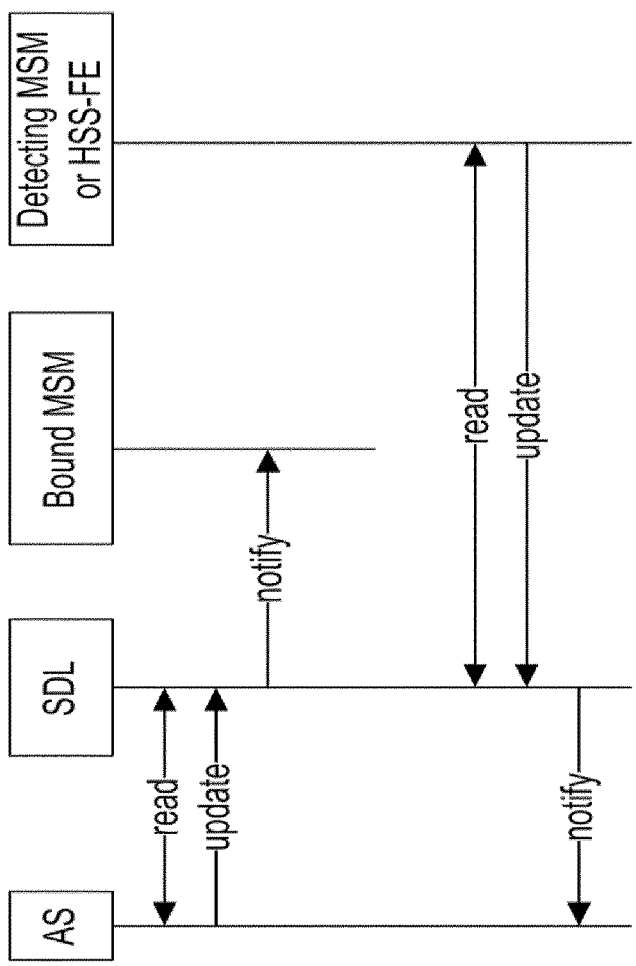
FIG. 10 shows that AS requests to be notified as soon as (and gets notification when) non-roaming UE becomes reachable (within HPLMN or in a VPLMN) according to some embodiments of the invention.

FIGS. 9 to 11

In this Example the piece of data X is the temporary indicator "reachability notification" which can take one of the values "requested" or "reachable". Write access (with value "requested") is granted to nodes (e.g. ASs) that need to be notified when the UE becomes reachable and to MSMs (inbound roaming case). Write access (with value "reachable") is granted to MSMs and HSS-FEs.

Nodes (other than MSMs) that have write access with value "requested" are also allowed to add their own address to the list of nodes to be notified in X's metadata along with a notify condition of "old value="requested" AND new value="reachable"", a selection mechanism "not applicable", and the one time notification set to "yes".

In addition—similar as in Example 1—the Current Serving Node Address (i.e. a node identifier, which effectively points to either the list of addresses of available HSS-FEs that can contact the external MSM, or the address of the specific MSM that has an ongoing transaction for the UE, or the list of addresses of MSMs that can serve the UE, or nothing depending on the current alternative type of the Current Serving Node Address) is configured to be in the list of nodes that must be notified when X is modified, along with a notify condition of "old value="reachable" AND new value="requested" AND Current Serving Node="external MSM" OR "specific MSM instance with ongoing transaction"", a selection mechanism of e.g. "round robin", and the one time notification set to "no".

As a consequence, when an AS updates X to become "requested" this results in a notification being sent from the SDL to the e.g. next in round HSS-FE (if the own UE is outbound roaming; FIG. 9); or a notification being sent from the SDL to the specific MSM instance (Bound MSM) that currently has an ongoing transaction for the UE (if the UE is not roaming and a specific MSM instance currently has an ongoing transaction for the UE; FIG. 10); or no notification is sent as the notify condition is not met (FIG. 11).

In the outbound roaming case (FIG. 9), after HSS-FE had been notified, the further procedure corresponds to that of FIG. 6 until the Bound or selected MSM updates SDL.

In all these cases the pointer to the Current Serving Node Address is not removed from list of nodes to be notified as the "one time notification" has value "no".

When an MSM updates X to become "requested", no notification is sent.

fter this, when an MSM (during any processing) detects that the UE is reachable while X has the value "requested" and the UE is a foreign inbound roamer, it updates X to become "reachable" and sends S6a-NOR to the HSS-FE in the HPLMN (FIG. 9) (via RA of HPLMN). The RA selects a suitable HSS-FE possibly after reading the SDL (not shown in FIG. 9). This is similar to FIG. 3 where the RA reads the SDL in order to select the MSM. Then, HSS-FE reads the UE data from SDL and updates them with the information that the UE is reachable. SDL then notifies the AS accordingly.

Correspondingly, in the non-roaming case, if a MSM detects that the UE is reachable, it reads the UE data from the SDL and updates them accordingly (FIG. 10). If the UE was not-roaming when the Bound MSM was notified and became roaming after that, the HSS-FE takes the role of the detecting MSM, as in the outbound roaming case of FIG. 9. Note that the detecting MSM may be the same or different from the Bound MSM at the time of notification that the "reachability notification" has the value "requested".

And, when an MSM (during any processing) detects that the UE is reachable while X has the value "requested" and the UE is not a foreign inbound roamer, it updates X to become "reachable". This results in all nodes (ASs) that have added their address to X's metadata being notified (FIG. 10). The nodes' address are then removed from X's metadata as the one time notification has value "yes".

And, when an HSS-FE receives S6a-NOR indicating that an own outbound roaming UE has become reachable, it updates X to become "reachable". This results in all nodes (ASs) that have added their address to X's metadata being notified (FIG. 9 or FIG. 10, depending on if the UE was roaming at the time of requesting reachability information). The nodes' addresses are then removed from X's metadata as the one time notification has value "yes".

As shown in FIG. 11, if the UE is not bound to a MSM instance at the time when an AS requests reachability information or if the UE is purged at that time, the SDL does not notify any MSM or HSS-FE on the request. Otherwise, FIG. 11 corresponds to FIG. 10.

According to some embodiments of the invention, metadata associated to a given piece of data stored in the SDL may comprise a list of (pointers to) node identities/addresses, potentially together with notification condition, selection mechanism (if the pointer to node identities/addresses points to a set of equivalent available nodes), one-time indication and data reference per entry of the list. Each entry in the list identifies a node (or a set of nodes) that must be notified (or out of which one or more nodes must be notified according to the selection mechanism) when the piece of data is modified while the associated notification condition is met. These metadata may be statically configured together with the piece of data itself (e.g. for permanent subscription data), or can be dynamically modified by nodes accessing the SDL (e.g. for dynamic subscription to notification). The kind of configuration of the metadata may additionally depend on the implementation.

Figure 13:
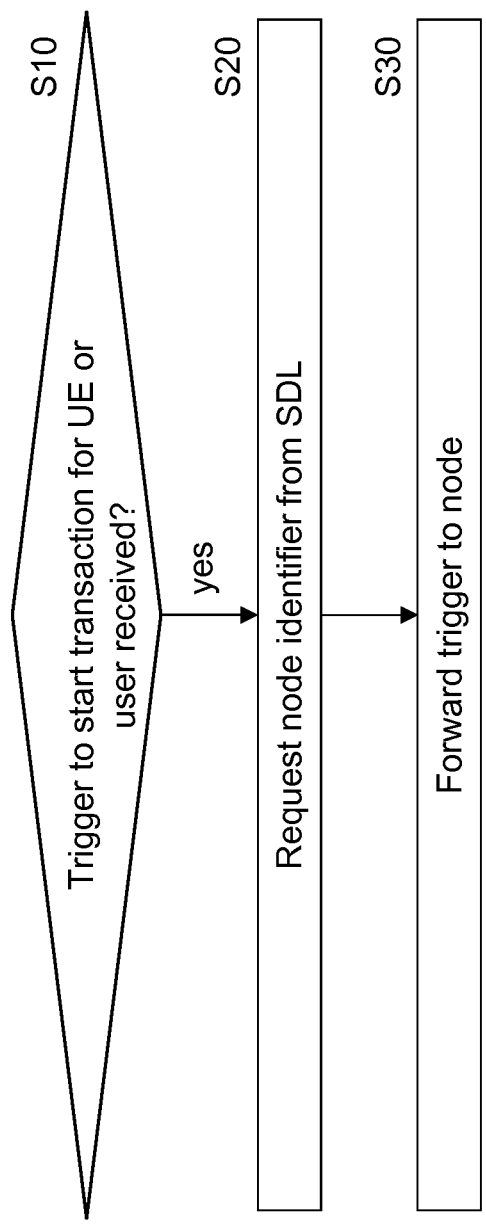
FIG. 13 shows a method according to an embodiment of the invention.
Figure 12:
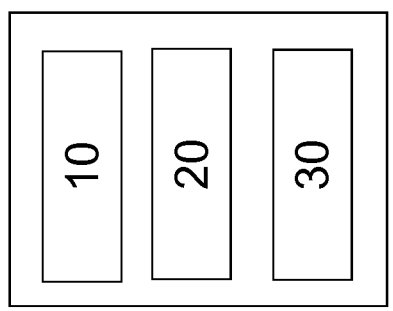
FIG. 12 shows an apparatus according to an embodiment of the invention.

FIG. 12 shows an apparatus according to an embodiment of the invention. The apparatus may be a RA or an element thereof. In particular, the apparatus may be a RA integrated in a MSM. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises monitoring means 10, requesting means 20, and forwarding means 30. The monitoring means 10, requesting means 20, and forwarding means 30 may be a monitoring processor, requesting processor, and forwarding processor, respectively.

The monitoring means 10 monitors if a trigger to start a transaction for a user equipment or for a user is received (S10).

When the trigger is received (S10="yes"), the requesting means 20 requests, from a shared data layer, an identifier of a set of one or more nodes (S20). The request is based on an identification of the user equipment if the transaction is for the user equipment. The request is based on an identification of the user if the transaction is for the user.

The forwarding means 30 forwards the trigger to at least one node among the one or more nodes of the set (S30).

FIG. 14 shows an apparatus according to an embodiment of the invention. The apparatus may be a SDL or an element thereof. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises monitoring means 60 and storing means 70. The monitoring means 60 and storing means 70 may be a monitoring processor and storing processor, respectively.

The monitoring means 60 monitors if an indication is received that a serving node handles a transaction for a user equipment or for a user (S60). When the indication is received (S60="yes"), the storing means 70 stores an identification of the serving node as being related to the user equipment if the transaction is for the user equipment (S70). When the indication is received (S60="yes"), the storing means 70 stores an identification of the serving node as being related to the user if the transaction is for the user (S70).

FIG. 16 shows an apparatus according to an embodiment of the invention. The apparatus may be a SDL or an element thereof. FIG. 17 shows a method according to an embodiment of the invention. The apparatus according to FIG. 16 may perform the method of FIG. 17 but is not limited to this method. The method of FIG. 17 may be performed by the apparatus of FIG. 16 but is not limited to being performed by this apparatus.

The apparatus comprises monitoring means 110, checking means 120, and notifying means 130. The monitoring means 110, checking means 120, and notifying means 130 may be a monitoring processor, checking processor, and notifying processor, respectively.

The monitoring means 110 monitors if a value of a stored datum is modified (S110). The datum is related to a user equipment or to a user.

The checking means 120 checks if a notify condition is fulfilled (S120). The notify condition is stored as being related to the datum. Respective identifiers of one or more sets are stored as being related to the notify condition. Each of the sets comprises respective one or more entities such as serving nodes, HSS, or application servers.

Steps S110 and S120 may be performed fully or partly in parallel or one after the other. The sequence of steps is arbitrary, i.e. S120 may follow S110, or S110 may follow S120.

If the value is modified (S110="yes") and the notify condition is fulfilled (S120="yes"), the notifying means 130 notifies at least one respective entity of each of the sets that the value of the datum is modified (S130).

FIG. 18 shows an apparatus according to an embodiment of the invention. The apparatus comprises at least one processor 410, at least one memory 420 including computer program code, and the at least one processor 410, with the at least one memory 420 and the computer program code, being arranged to cause the apparatus to at least perform at least one of the methods according to FIGS. 13, 15, and 17.

Embodiments of the invention may be employed in a 3GPP network such as LTE or LTE-A, or in a 5G network. They may be employed also in other communication networks such as CDMA, EDGE, LTE, UTRAN networks, etc. and even fixed networks.

Instead of a HSS-FE, a HSS or HLR or a corresponding subscriber register may take a corresponding role as the HSS-FE in some embodiments of the invention.

A user equipment may be e.g. a mobile phone, a smart phone, a PDA, a laptop, a tablet PC, a wearable, a machine-to-machine device, or any other device which may be connected to the respective mobile network. If not otherwise indicated or made clear from the context, a UE is considered to include the meaning of a user of the UE (typically a subscriber of the mobile network) and the meaning of a UE without a user such as a machine-to-machine device.

According to some embodiments, the transaction may be related to a user equipment. The user equipment may be identified e.g. by its IMEI. In some embodiments, the transaction may be related to a user (a subscription) instead. A user (a subscription) may be identified e.g. by one of IMSI and MSISDN. In some embodiments, the transaction may be related to a combination of user equipment and user.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a routing agent, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a serving node such as a MSM, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a shared data layer, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising:
at least one processor; and
at least one memory including computer program code,
wherein the at least one memory and the computer program code are configured to, with the least one processor, cause the apparatus to:
monitor if a value of a stored datum is modified, wherein the datum is related to a user equipment or a user;
check if a notify condition is fulfilled, wherein respective identifiers of one or more sets are stored as being related to the notify condition, each of the sets comprises respective one or more entities, and the notify condition is stored as being related to the datum; and
notify at least one respective device of each of the sets that the value of the datum is modified if the value is modified and the notify condition is fulfilled.

2. The apparatus according to claim 1, wherein each of the entities is one of a serving node, a front end of a subscriber register, and an application server.

3. The apparatus according to claim 1, wherein the notify condition is statically configured, or wherein the notify condition is dynamically configurable.

4. Method, comprising:
monitoring if a value of a stored datum is modified, wherein the datum is related to a user equipment or a user;
checking if a notify condition is fulfilled, wherein respective identifiers of one or more sets are stored as being related to the notify condition, each of the sets comprises respective one or more entities, and the notify condition is stored as being related to the datum; and
notifying at least one respective device of each of the sets that the value of the datum is modified if the value is modified and the notify condition is fulfilled.

5. The method according to claim 4, wherein each of the entities is one of a serving node, a front end of a subscriber register, and an application server.

6. The method according to claim 4, wherein the notify condition is statically configured, or wherein the notify condition is dynamically configurable.

\* \* \* \* \*